US010324756B2

(12) United States Patent
Branson et al.

(10) Patent No.: US 10,324,756 B2
(45) Date of Patent: *Jun. 18, 2019

(54) DYNAMIC REDUCTION OF STREAM BACKPRESSURE

(71) Applicant: International Business Machines Corporation, Armonk, NY (US)

(72) Inventors: Michael J. Branson, Rochester, MN (US); Ryan K. Cradick, Oronoco, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/404,366

(22) Filed: Jan. 12, 2017

(65) Prior Publication Data

US 2017/0123851 A1    May 4, 2017

Related U.S. Application Data

(63) Continuation of application No. 15/063,710, filed on Mar. 8, 2016, now Pat. No. 9,588,812, which is a
(Continued)

(51) Int. Cl.
*G06F 9/46* (2006.01)
*G06F 9/48* (2006.01)
(Continued)

(52) U.S. Cl.
CPC ......... *G06F 9/4887* (2013.01); *G06F 9/4843* (2013.01); *G06F 9/5083* (2013.01); *G06F 16/24568* (2019.01); *G06F 16/9024* (2019.01)

(58) Field of Classification Search
None
See application file for complete search history.

(56) References Cited

U.S. PATENT DOCUMENTS

| 4,612,624 A | 9/1986 | Tsuji |
| 6,243,755 B1 | 6/2001 | Takagi et al. |

(Continued)

FOREIGN PATENT DOCUMENTS

| CN | 104094232 A | 10/2014 |
| DE | 112013000752 T5 | 12/2014 |

(Continued)

OTHER PUBLICATIONS

Lipasti et al., "Exceeding the dataflow limit via value prediction.", In Proceedings of the 29th annual ACM/IEEE International symposium on Microarchitecture (Micro 29), IEEE Computer Society, Washington, DC, USA, 226-237, Dec. 1996.

(Continued)

*Primary Examiner* — Lewis A Bullock, Jr.
*Assistant Examiner* — Melissa A Headly
(74) *Attorney, Agent, or Firm* — Patterson + Sheridan, LLP

(57) ABSTRACT

Techniques are described for eliminating backpressure in a distributed system by changing the rate data flows through a processing element. Backpressure occurs when data throughput in a processing element begins to decrease, for example, if new processing elements are added to the operating chart or if the distributed system is required to process more data. Indicators of backpressure (current or future) may be monitored. Once current backpressure or potential backpressure is identified, the operator graph or data rates may be altered to alleviate the backpressure. For example, a processing element may reduce the data rates it sends to processing elements that are downstream in the operator graph, or processing elements and/or data paths may be eliminated. In one embodiment, processing elements and associate data paths may be prioritized so that more important execution paths are maintained.

20 Claims, 7 Drawing Sheets

Related U.S. Application Data continuation of application No. 13/682,008, filed on Nov. 20, 2012, now Pat. No. 9,389,911, which is a continuation of application No. 13/190,694, filed on Jul. 26, 2011, now Pat. No. 8,990,452.

(51) Int. Cl.
  *G06F 16/901* (2019.01)
  *G06F 16/2455* (2019.01)
  *G06F 9/50* (2006.01)

(56) References Cited

U.S. PATENT DOCUMENTS

| | | |
|---|---|---|
| 6,347,254 B1 | 2/2002 | Lu |
| 6,516,409 B1 | 2/2003 | Sato |
| 7,206,861 B1 | 4/2007 | Callon |
| 7,480,640 B1 | 1/2009 | Elad et al. |
| 7,529,752 B2 | 5/2009 | Hinshaw et al. |
| 7,577,667 B2 | 8/2009 | Hinshaw et al. |
| 7,644,863 B2 | 1/2010 | Chen et al. |
| 7,834,875 B2 | 11/2010 | Liu et al. |
| 7,860,009 B2 | 12/2010 | Pike et al. |
| 7,944,863 B2 | 5/2011 | Smith et al. |
| 8,055,492 B2 | 11/2011 | Adir |
| 8,090,974 B1 | 1/2012 | Jain et al. |
| 8,560,527 B2 | 10/2013 | Santosuosso et al. |
| 8,776,052 B2 | 7/2014 | Zohar |
| 8,819,685 B2 | 8/2014 | Zhang et al. |
| 8,954,713 B2 | 2/2015 | Santosuosso et al. |
| 8,990,452 B2 | 3/2015 | Branson et al. |
| 9,124,505 B2 | 9/2015 | Luo et al. |
| 9,135,057 B2 | 9/2015 | Branson et al. |
| 9,146,775 B2 | 9/2015 | Branson et al. |
| 9,148,495 B2 | 9/2015 | Cradick et al. |
| 9,148,496 B2 | 9/2015 | Cradick et al. |
| 9,389,911 B2 | 7/2016 | Branson et al. |
| 9,405,553 B2 | 8/2016 | Branson et al. |
| 2002/0083063 A1 | 6/2002 | Egolf |
| 2003/0229817 A1 | 12/2003 | Colasurdo et al. |
| 2004/0052212 A1 | 3/2004 | Baillargeon |
| 2006/0004935 A1 | 1/2006 | Seto et al. |
| 2006/0026269 A1 | 2/2006 | Sadovsky et al. |
| 2006/0036619 A1 | 2/2006 | Fuerst et al. |
| 2006/0064438 A1 | 3/2006 | Aggarwal |
| 2006/0206706 A1 | 9/2006 | Dietz |
| 2006/0218123 A1 | 9/2006 | Chowdhuri et al. |
| 2006/0224763 A1 | 10/2006 | Altunbasak et al. |
| 2006/0277230 A1 | 12/2006 | Nishizawa et al. |
| 2007/0073685 A1 | 3/2007 | Thibodeau et al. |
| 2007/0091089 A1 | 4/2007 | Jiao et al. |
| 2007/0091827 A1 | 4/2007 | Boers et al. |
| 2007/0129045 A1 | 6/2007 | Aerrabotu |
| 2007/0147258 A1 | 6/2007 | Mottishaw et al. |
| 2007/0240112 A1 | 10/2007 | Haselden et al. |
| 2007/0288635 A1 | 12/2007 | Gu et al. |
| 2007/0299980 A1 | 12/2007 | Amini et al. |
| 2008/0000539 A1 | 1/2008 | Bivin |
| 2008/0005392 A1* | 1/2008 | Amini ............... H04L 29/06027 710/29 |
| 2008/0028095 A1 | 1/2008 | Lang et al. |
| 2008/0052041 A1 | 2/2008 | Misra et al. |
| 2008/0071939 A1 | 3/2008 | Tanaka et al. |
| 2008/0168179 A1 | 7/2008 | Gu et al. |
| 2008/0219281 A1 | 9/2008 | Akin et al. |
| 2008/0238923 A1 | 10/2008 | Liu et al. |
| 2009/0003600 A1 | 1/2009 | Chen et al. |
| 2009/0034498 A1 | 2/2009 | Banerjea et al. |
| 2009/0037553 A1 | 2/2009 | Yuan et al. |
| 2009/0178043 A1 | 7/2009 | Prasanna et al. |
| 2009/0216624 A1 | 8/2009 | Kato |
| 2009/0216694 A1 | 8/2009 | Lang et al. |
| 2009/0254774 A1 | 10/2009 | Chamdani et al. |
| 2009/0313400 A1 | 12/2009 | Amini et al. |
| 2009/0313614 A1 | 12/2009 | Andrade et al. |
| 2009/0313641 A1 | 12/2009 | Chou et al. |
| 2010/0030896 A1 | 2/2010 | Chandramouli et al. |
| 2010/0106946 A1 | 4/2010 | Imaki et al. |
| 2010/0199276 A1 | 8/2010 | Umbehocker |
| 2010/0229178 A1 | 9/2010 | Ito |
| 2010/0292980 A1 | 11/2010 | Andrade et al. |
| 2010/0293532 A1 | 11/2010 | Andrade et al. |
| 2010/0293535 A1 | 11/2010 | Andrade et al. |
| 2011/0022812 A1 | 1/2011 | van der Linden et al. |
| 2011/0191759 A1 | 8/2011 | Andrade et al. |
| 2012/0123994 A1 | 5/2012 | Lowry et al. |
| 2012/0166417 A1 | 6/2012 | Chandramouli et al. |
| 2012/0179809 A1 | 7/2012 | Barsness et al. |
| 2012/0324453 A1 | 12/2012 | Chandramouli et al. |
| 2013/0031124 A1 | 1/2013 | Santosuosso et al. |
| 2013/0031263 A1 | 1/2013 | Cradick et al. |
| 2013/0031335 A1 | 1/2013 | Santosuosso et al. |
| 2013/0031556 A1 | 1/2013 | Branson et al. |
| 2013/0080652 A1 | 3/2013 | Cradick et al. |
| 2013/0080653 A1 | 3/2013 | Santosuosso et al. |
| 2013/0081042 A1 | 3/2013 | Branson et al. |
| 2013/0198318 A1 | 8/2013 | Branson et al. |
| 2013/0198489 A1 | 8/2013 | Branson et al. |
| 2013/0290969 A1 | 10/2013 | Branson et al. |
| 2013/0339974 A1* | 12/2013 | Mitchell ............ G06F 9/50 718/104 |
| 2013/0346390 A1 | 12/2013 | Jerzak et al. |
| 2014/0136723 A1 | 5/2014 | Branson et al. |
| 2014/0136724 A1 | 5/2014 | Branson et al. |
| 2016/0188364 A1 | 6/2016 | Branson et al. |
| 2017/0004014 A1 | 1/2017 | Branson et al. |

FOREIGN PATENT DOCUMENTS

| | | |
|---|---|---|
| GB | 2510769 A | 8/2014 |
| JP | 10097437 A | 4/1998 |
| JP | H1097437 A | 4/1998 |
| JP | H11097437 A | 4/1998 |
| JP | 2001325041 A | 11/2001 |
| WO | 2010020577 A1 | 2/2010 |
| WO | 2013014623 A1 | 1/2013 |
| WO | 2013114228 A1 | 8/2013 |

OTHER PUBLICATIONS

Da Costa et al, "The Dynamic Trace Memorization Reuse Technique", Parallel Architectures and Compilation Techniques, Oct. 2000, pp. 92-99, Philadelphia, USA.

Ishii, Atsushi et al., Elastic Stream Computing with Clouds, 2011 IEEE 4th International Conference on Cloud Computing, Jul. 2011, pp. 195-202, IEEE, Piscataway, United States. [Available Online] http://ieeexplore.ieee.org/document/6008710/?reload=true&arnumber=6008710.

Jan. 12, 2017, U.S. Appl. No. 15/404,366.

Jul. 26, 2011, U.S. Appl. No. 13/190,694, U.S. Pat. No. 8,990,452.

Nov. 20, 2012, U.S. Appl. No. 13/682,008, U.S. Pat. No. 9,389,911.

Mar. 8, 2016, U.S. Appl. No. 15/063,710.

Dacosta et al., "The Dynamic Trace Memoization Reuse Technique", Parallel Architectures and Compilation Techniques, Oct. 2000, pp. 92-99, Philadelphia, USA.

International Search Report and Written Opinion of the ISA dated Dec. 20, 2012—International Application No. PCT/182012/053790.

International Search Report and Written Opinion of the ISA dated May 14, 2013—International Application No. PCT/182013/050228.

Lipasti et al., "Exceeding the dataflow limit via value prediction.", In Proceedings of the 29th annual ACM/IEEE international symposium on Microarchitecture (MICRO 29), IEEE Computer Society, Washington, DC, USA, 226-237.

Gedik, Bugra et al., SPADE: The System S Declarative Stream Processing Engine, Proceedings of the 2008 ACM; SIGMOD international conference on Management of data, Jun. 2008, pp. 1123-1134, ACM, New York, United States.

Ishii, Atsushi et al., Elastic Stream Computing with Clouds, 2011 IEEE 4th International Conference on Cloud Computing, 2011, pp. 195-202, IEEE, Piscataway, United States.

(56) References Cited

OTHER PUBLICATIONS

International Search Report PCT/IB2012/053790.
International Search Report PCT/IB2013/050228.
Ishii, Atsushi et al., Elastic Stream Computing with Clouds, 2011 IEEE 4th International Conference on Cloud Computing, Jul. 2011, pp. 195-202, IEEE, Piscataway, United States.
Gedik, Bugra et al., SPADE: The System 8 Declarative Stream Processing Engine. Proceedings of the 2008 ACM IGMOD international conference on Management of data, Jun. 2008, pp. 1123-1134, ACM, New York, United States.
Gedik, Bugra et al., SPADE: The System S Declarative Stream Processing Engine, Proceedings of the 2008 ACM SIGMOD international conference on Management of data, Jun. 2008, pp. 1123-1134, ACM, New York, United States.
International Search Report and Written Opinion of the ISA dated Dec. 20, 2012—International Application No. PCT/IB2012/053790.
International Search Report and Written Opinion of the ISA dated May 14, 2013—International Application No. PCT/IB2013/050228.

* cited by examiner

DYNAMIC REDUCTION OF STREAM BACKPRESSURE

CROSS-REFERENCE TO RELATED APPLICATIONS

This application is a continuation of co-pending U.S. patent application Ser. No. 15/063,710, filed Mar. 8, 2016, which is a continuation of Ser. No. 13/682,008, filed Nov. 20, 2012, now U.S. Pat. No. 9,389,911, which is a continuation of patented U.S. patent application Ser. No. 13/190,694, filed Jul. 26, 2011, now U.S. Pat. No. 8,990,452. The aforementioned related patent applications are herein incorporated by reference in their entirety.

BACKGROUND

Field of the Invention

Embodiments of the present invention generally relate to stream applications. Specifically, the invention relates to detecting and reducing backpressure in a stream application.

Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

One embodiment herein is a method for processing data which includes receiving streaming data to be processed by a plurality of processing elements, the processing elements processing at least a portion of the received data by operation of one or more computer processors, where each of the processing elements comprises an executable portion of code. The method includes establishing an operator graph of the plurality of processing elements, the operator graph defining at least one execution path through which the streaming data flows through the plurality of processing elements, and where each processing element in the execution path is configured to at least one of receive data from at least one upstream processing element and transmit data to at least one downstream processing element. The method includes receiving a request to add at least one processing element to the execution path of the operator graph. Before adding the at least one processing element, the method includes identifying a predicted relative change of data throughput in a first processing element in the execution path, where the predicted relative change of data is based on predicting a utilization rate of one of the computer processors resulting from adding the at least one processing element to the operator graph. Upon determining that the relative change of data throughput satisfies a predetermined threshold, the method includes determining not to add the at least one processing element to the operator graph.

Another embodiment herein is a system for processing data that includes a computer process and a memory containing a program that, when executed on the computer processor, performs an operation for processing data. The operation includes receiving streaming data to be processed by a plurality of processing elements, where each of the processing elements comprises an executable portion of code and establishing an operator graph of the plurality of processing elements, the operator graph defining at least one execution path through which the streaming data flows through the plurality of processing elements, and where each processing element in the execution path is configured to at least one of receive data from at least one upstream processing element and transmit data to at least one downstream processing element. The operation includes receiving a request to add at least one processing element to the execution path of the operator graph and, before adding the at least one processing element, identifying a predicted relative change of data throughput in a first processing element in the execution path, where the predicted relative change of data is based on predicting a utilization rate of the computer processor resulting from adding the at least one processing element. Upon determining that the relative change of data throughput satisfies a predetermined threshold, the operation includes determining not to add the at least one processing element to the operator graph.

Another embodiment herein is computer program product for processing data that includes a non-transitory computer-readable storage medium having computer-readable program code embodied therewith, the computer-readable program code, when executed on one or more computer processors, is configured to receive streaming data to be processed by a plurality of processing elements, the processing elements processing at least a portion of the received data by operation of the one or more computer processors, where each of the processing elements comprises an executable portion of code. The computer-readable program code is configured to establish an operator graph of the plurality of processing elements, the operator graph defining at least one execution path through which the streaming data flows through the plurality of processing elements, and where each processing element in the execution path is configured to at least one of receive data from at least one upstream processing element and transmit data to at least one downstream processing element. The computer-readable program code is configured to receive a request to add at least one processing element to the execution path of the operator graph and, before adding the at least one processing element, identify a predicted relative change of data throughput in a first processing element in the execution path, where the predicted relative change of data is based on predicting a utilization rate of one of the computer processors resulting from adding the at least one processing element. Upon determining that the relative change of data throughput satisfies a predetermined threshold, the computer-readable program code is configured to determine not to add the at least one processing element to the operator graph.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are

DETAILED DESCRIPTION

Figure 1A:
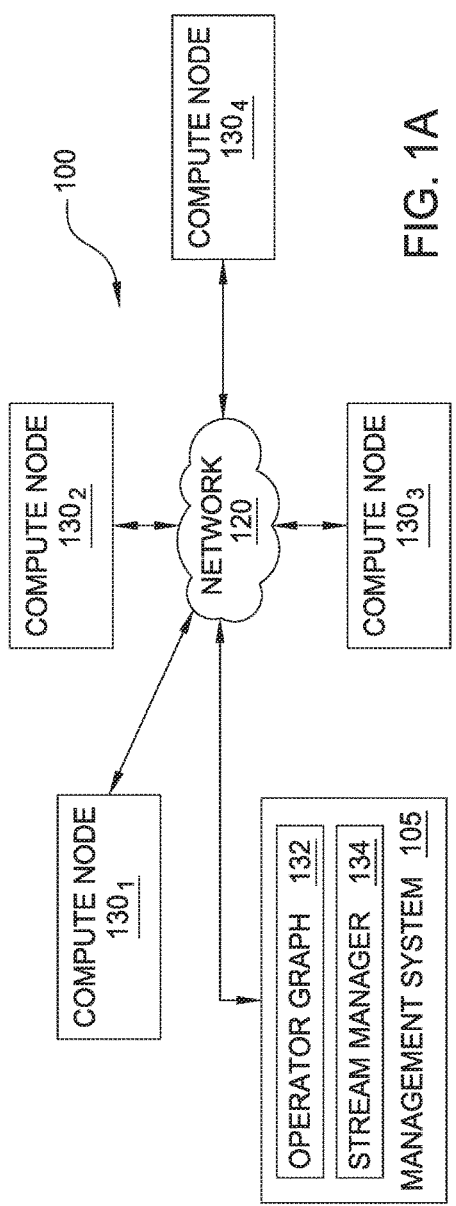
FIGS. 1A-1B illustrate a computing infrastructure configured to execute a stream application, according to one embodiment of the invention.

Stream-based computing is emerging as a technology that enables continuous analysis of large amounts of moving data to improve a user's decision making process. Products are available which allow users to create applications that process and query streaming data before it reaches a repository. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream application, operators are connected to one another such that data flows from one operator to the next forming a logical dataflow graph. Scalability is reached by distributing an application across nodes by creating many small executable pieces of code (i.e., processing elements), as well as load balancing among them. One or more operators in a stream application can be fused together to form a processing element. Doing so allows the fused operators to share a common process space, resulting in much faster communication between operators than is available using inter-process communication techniques (e.g., using a TCP/IP socket). Further, groups of processing elements (i.e., jobs) can be inserted or removed dynamically from one or more applications performing streaming data analysis.

One advantage of stream applications is that they allow the user to granularly control the process flow of data through the application. In other words, the user may designate specific operators for each processing element that perform various operations on the incoming data, and may dynamically alter the stream application by modifying the operators and the order in which they are performed.

However, because stream applications often deal with large volumes of data, the processing of which is spread over multiple processing elements across multiple compute nodes, backpressure may slow down the processing of a particular execution path. "Backpressure" may be defined as a decrease of data throughput through a processing element. Specifically, a processing element experiences backpressure if the processing element is unable to receive data from another upstream processing element because, for example, a buffer associated with the processing element is already at maximum capacity. Backpressure may be prevented, however, by monitoring one or more indicators that predict if backpressure may occur. These indicators determine whether a processing element is able to process data as fast as data is received. Decreasing data throughput means the ratio of processed data to received data in a processing element is also decreasing. An indicator of backpressure may be buffer utilization, computer processor unit (CPU) utilization, or transient time of data through the processing element. Once a first processing element experiences backpressure—e.g., its buffer reaches maximum capacity such that it can no longer accept data from other upstream processing elements—the backpressure begins to spread to these upstream processing elements since the first processing element can no longer accept data from the upstream processing elements. The upstream processing element must then store the refused data in their own buffers. The buffer capacities of the processing elements experiencing backpressure may be increased, but this approach merely delays the spreading of the backpressure to other processing elements and does not decrease the time needed for data to flow through the distributed system.

Embodiments of the invention provide techniques for identifying indicators of backpressure and taking measures to alleviate the backpressure or prevent the backpressure from occurring. In particular, embodiments of the invention may use historical information collected from multiple executions, current CPU usage, buffer usage, response time and the like as indicators of current or future backpressure. Once an indicator is identified, an action is taken to alleviate the current backpressure or prevent the backpressure from occurring.

If the processing element is currently experiencing backpressure, a second processing element that feeds data into the processing element may be removed, or the last processing element added to the operator graph which contributes to the backpressure may be removed (e.g., LIFO). Alternatively, where multiple processing elements send data to the processing element or where one processing element transmits data on multiple data paths, the data rate for each of the data paths may be reduced. Moreover, the multiple processing elements or data paths may be prioritized according to importance of the data or data paths, amount of data they send, or their transient times. The assigned priority may then be used to determine which processing element to eliminate or which data rate to reduce.

If the processing element will experience future backpressure, a request to add a new processing element may be refused. Alternatively, the request may be granted but the data rates may be prioritized and reduced such that the backpressure is prevented.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider. Doing so allows a user to access this information from any computing system attached to a network connected to the cloud (e.g., the Internet).

Figure 1B:
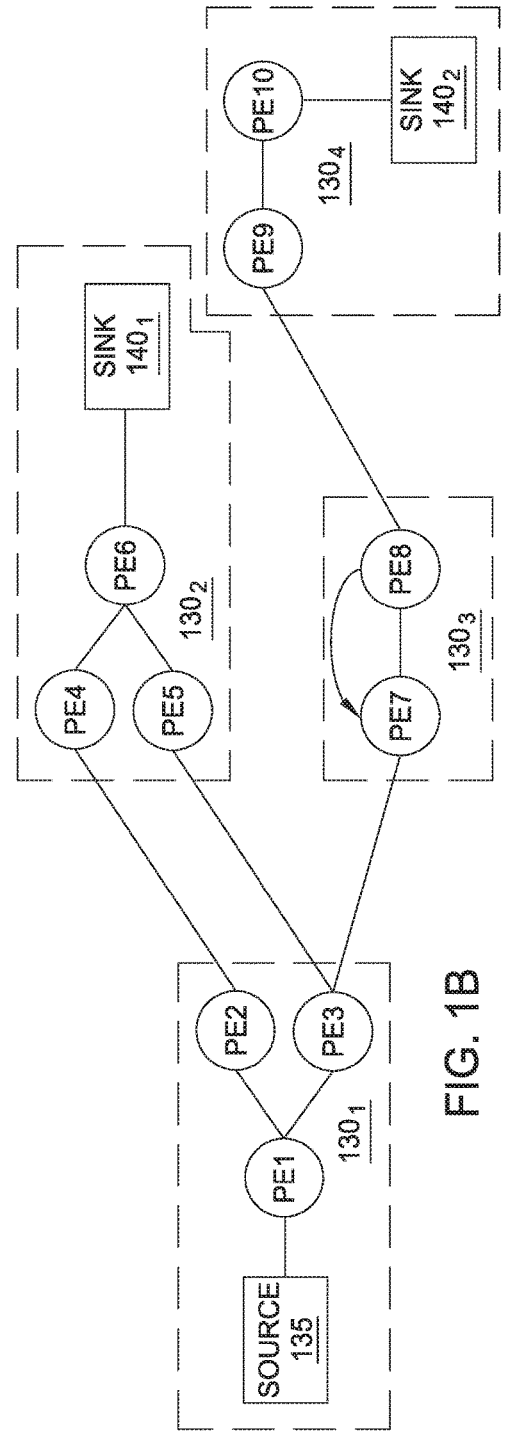

FIGS. 1A-1B illustrate a computing infrastructure configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream application beginning from one or more source operators through to one or more sink operators. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Typically, processing elements receive an N-tuple of data attributes from the stream as well as emit an N-tuple of data attributes into the stream (except for a sink operator where the stream terminates or a source operator where the stream starts). Of course, the N-tuple received by a processing element need not be the same N-tuple sent downstream. Additionally, the processing elements could be configured to receive or emit data in formats other than an N-tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$. Additionally, the stream manager 134 may request that a processing element change the rate at which data is emitted from the element.

In one embodiment of the invention, the management system 105 may maintain multiple operator graphs 132. In such an embodiment, one operator graph 132 is designated as the primary operator graph, which represents the general or default processing flow, while the other operator graphs may represent alternate processing flows that may be used, for example, to reduce or prevent backpressure.

FIG. 1B illustrates an example operator graph that includes ten processing elements (labeled as PE1-PE10) running on the compute nodes $130_{1-4}$. While a processing element may be executed as an independently running process with its own process ID (PID) and memory space, multiple processing elements may also be fused to run as single process or job (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among the joined operators in the fused processing elements.

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
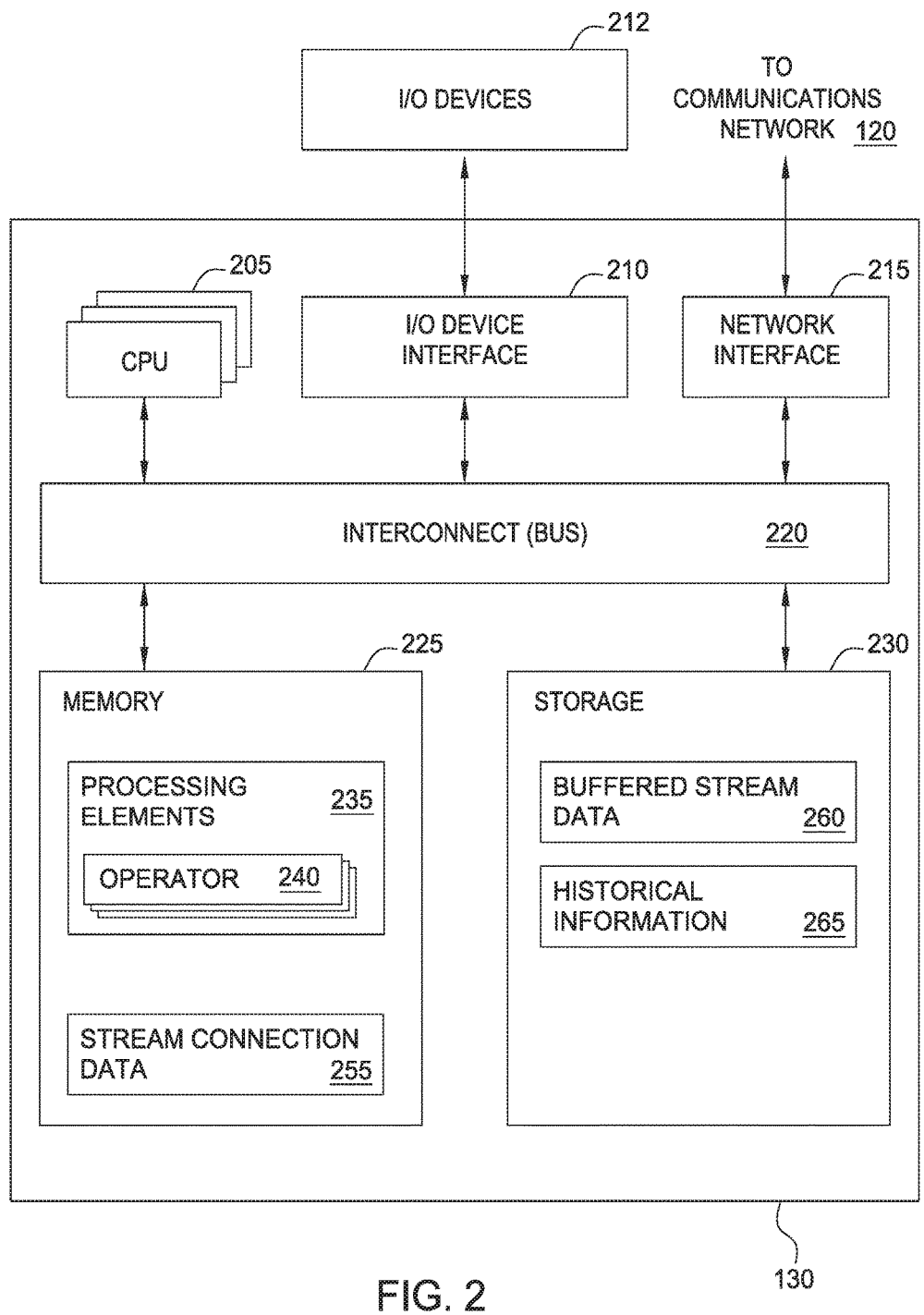
FIG. 2 is a more detailed view of the compute node of FIGS. 1A-1B, according to one embodiment of the invention.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235 and stream connection data 255. Each PE 235 includes a collection of operators 240. As noted above, each operator 240 may provide a small chunk of executable code configured to process data flowing into a processing element (e.g., PE 235) and to emit data to other operators 240 in that PE and to other processing elements in the stream application. Such processing elements may be on the same compute node 130 or on other compute nodes accessible over the data communications network 120. The stream connection data 255 represents the connections between PEs on compute node 130 (e.g., a TCP/IP socket connection between two separate PEs 235), as well as connections to other compute nodes 130 with upstream and or downstream PEs in the stream application, also via TCP/IP sockets (or other inter-process data communication mechanisms).

As shown, storage 230 contains buffered stream data 260 and historical information 265. The buffered stream data 260 represents a storage space for data flowing into the compute node 105 from upstream processing elements (or from a data source for the stream application). For example, buffered stream data 260 may include data tuples waiting to be processed by one of the PEs 235—i.e., a buffer. Buffered stream data 260 may also store the results of data processing performed by processing elements 235 that will be sent to downstream processing elements. For example, a PE 235 may have to store tuples intended for a downstream PE 235 if that PE 235 already has a full buffer, which may occur when the operator graph is experiencing backpressure. On the other hand, the historical information 265 is formulated after running a particular stream application several times. Historical information 265 can be, for example, the conditions or operator graph that caused backpressure. In sum, the buffered stream data 260 is a real-time measurement while the historical information 265 is a predictor of whether the PE 235 may experience backpressure.

Figure 3:
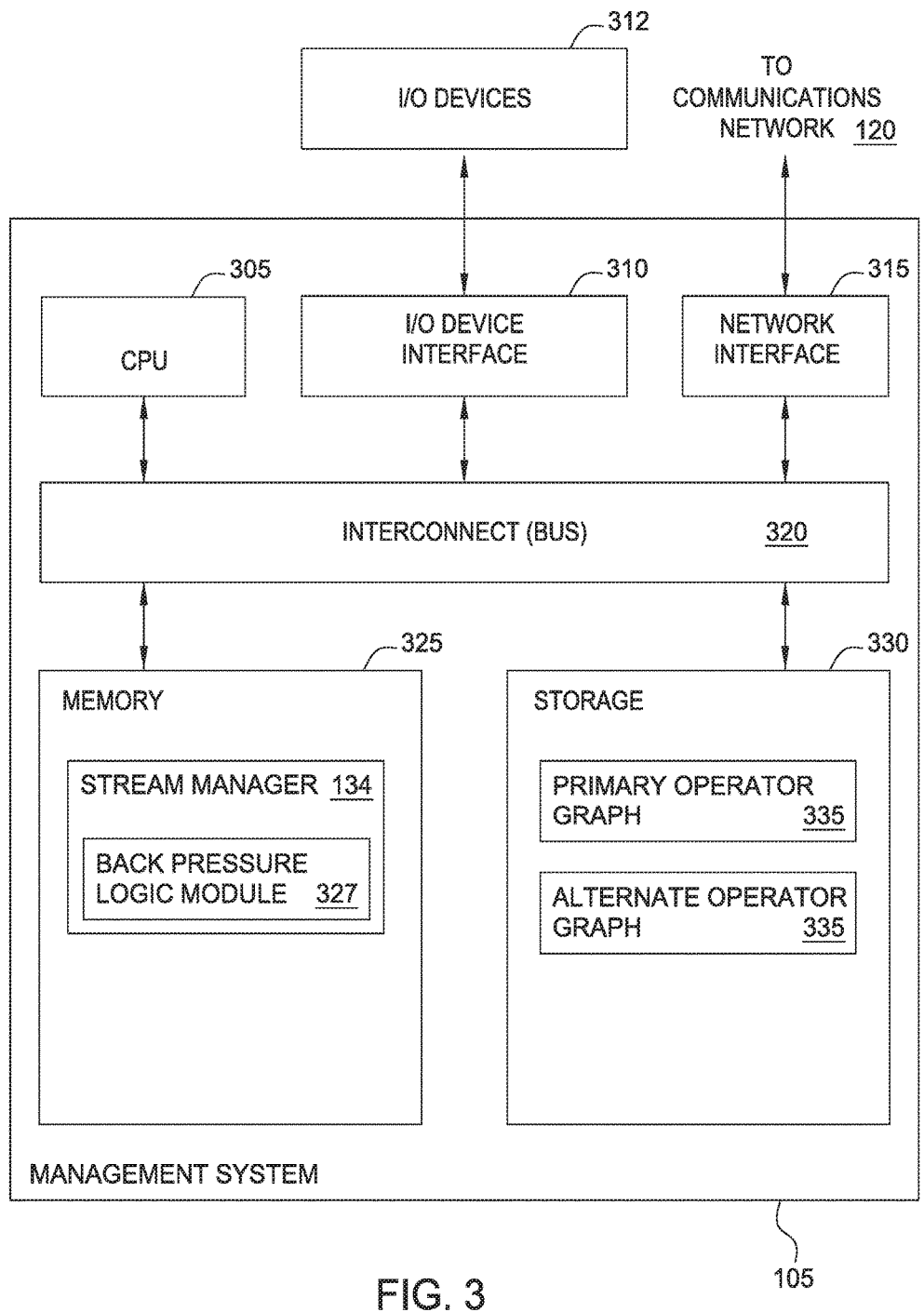
FIG. 3 is a more detailed view of the server computing system of FIG. 1, according to one embodiment of the invention.

FIG. 3 is a more detailed view of the server computing system 105 of FIG. 1, according to one embodiment of the invention. As shown, server computing system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132 and an alternate operator graph 340. The stream manager 134 may generally route tuples received as part of a data stream to PEs 235 to be processed, according to the primary operator graph 132. Additionally, the stream manager 134 can access the historical information 265 and buffered stream data 260 located on each compute node 130. These two elements provide the stream manager 134 with the necessary information to detect current or future backpressure. For example, if the buffered stream data 260 shows the stream manager 134 that the buffer is nearly full of received tuples, the stream manager 134 may remove a processing element that sends tuples to the processing element with the full buffer. Alternatively, the stream manager 134 may identify that a CPU 205 on a different computer node 130 has free processing power. In such a scenario, the stream manager 134 may move a processing element 235 to the different compute node 130 with the available processing power to alleviate or prevent the backpressure.

The stream manager 134 may include a backpressure logic module 327 which includes logic for alleviating or preventing backpressure after an indicator of backpressure is detected. The backpressure logic module 327 may be a configuration file (e.g., an XML configuration file) that instructs the stream manager 134 which action to take to lessen or prevent backpressure. These actions include deleting processing element and/or data paths, changing the amount of data transmitted on data paths, or refusing to add jobs or processing elements to an operator graph.

Figure 4:
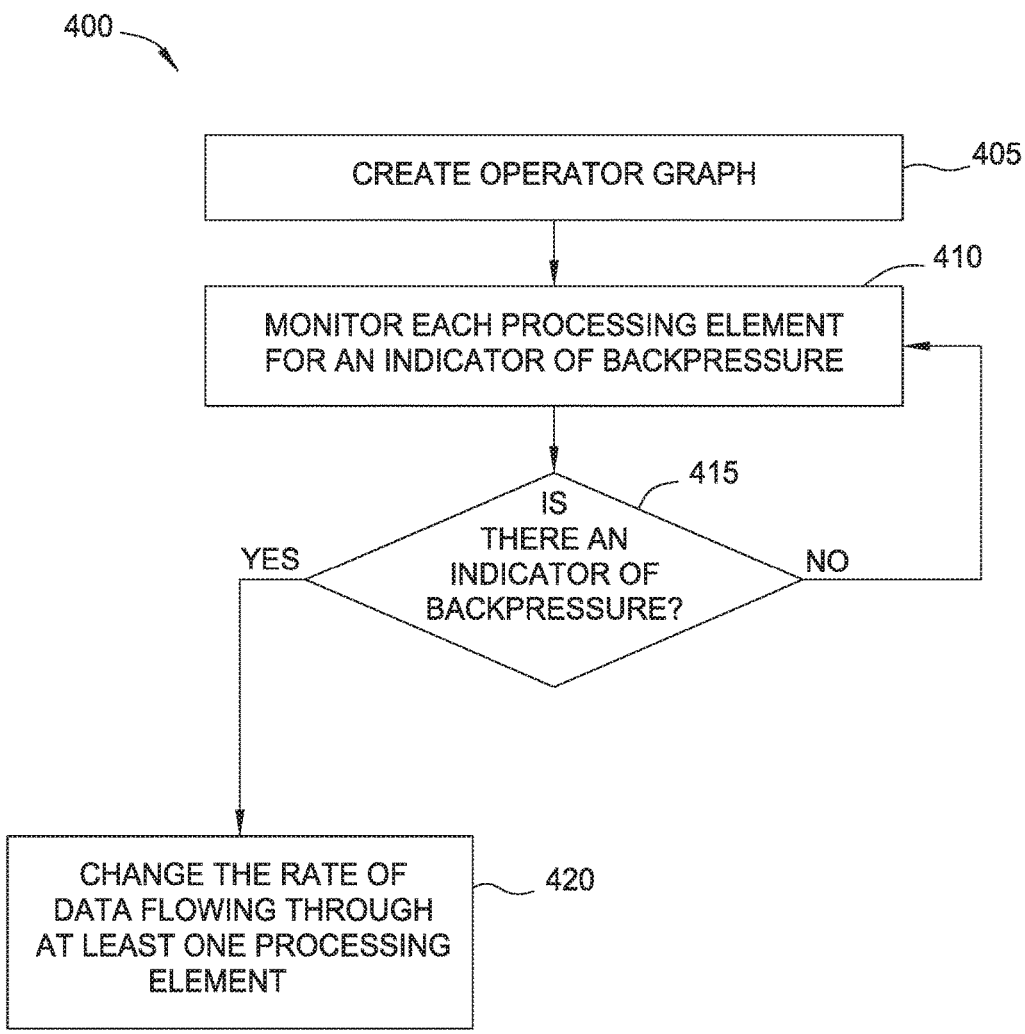
FIG. 4 is a flow diagram illustrating a method of removing or preventing backpressure, according to embodiments of the invention.

FIG. 4 is a flow diagram illustrating a method of mitigating or preventing backpressure, according to embodiments of the invention. At step 405, the stream manager 134 creates an operator graph 132 which includes at least one processing element 235 that receives data or tuples from at least one other processing element 235.

Figure 5:
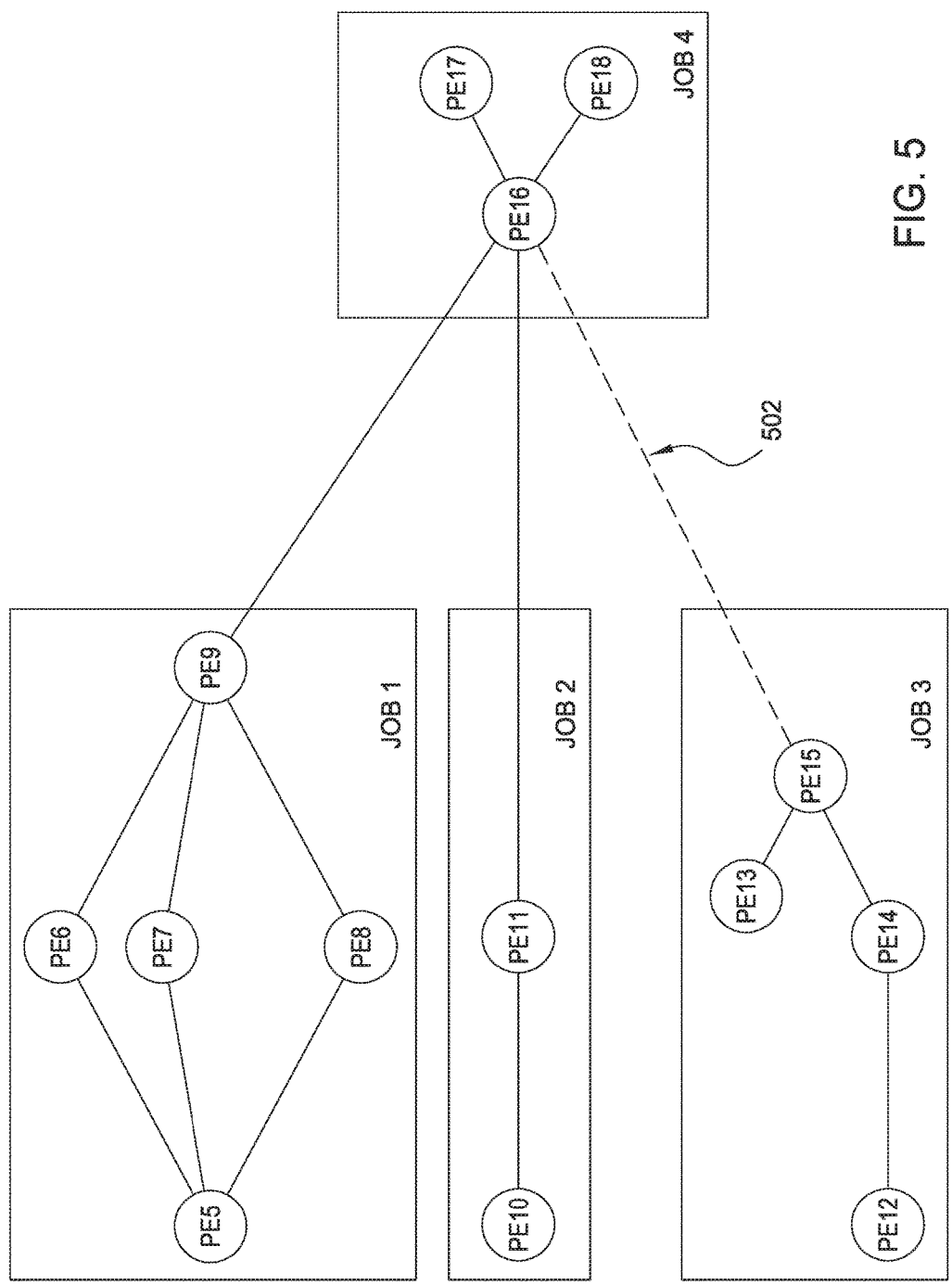
FIG. 5 is a diagram illustrating a system that may create backpressure, according to one embodiment of the invention.

FIG. 5 is a diagram illustrating a system that may create backpressure, according to one embodiment of the invention. FIG. 5 is one example of an operator graph 132 that has at least one processing element—PE16—that receives data from at least one other processing element—PE9 or PE11. In this embodiment, processing elements are arranged into separate jobs. Each job contains one or more processing elements which perform a specific task such as concatenating or combining tuples, writing to a database, retrieving data from a database, executing other database operations such as data joins, splits, or reads, accessing a third party service, and the like. Each job may then send tuples to a second job where another task may be performed; for example, Jobs 1 and 2 each send tuples to Job 4. Specifically, PE9 and PE11 both send tuples or data to PE16. Further, Job 3 has not yet been added to the operator graph 132 as indicated by the ghosted line 502. At a later time, the stream manager 134 may receive a request to add Job 3 to the operator graph 132 such that Job 3 begins to send tuples to Job 4. Note that the processing elements and jobs may be scattered on a plurality of nodes 130. For example, PE13 and PE18 may be located on the same node (not shown) even though they are grouped in separate jobs. Stated differently, the software implementation of grouping the processing elements into jobs may be done independently of the hardware that runs the processing elements.

In one embodiment, backpressure may occur when only one processing element sends data to a second processing element. For example, in Job 2, PE10 sends tuples to PE11. If PE10 begins to send twice as many tuples, or sends tuples that include more data, such that the CPU 205 associated with PE11 cannot process the tuples as quickly as they are received, the buffered stream data 260 associated with PE11's buffer may begin to increase. Once the buffer reaches the maximum capacity, PE11 may refuse a portion of the tuples sent to it by PE10, thereby forcing PE10 to store the rejected tuples in its own buffer as a result of the backpressure. Once PE10's buffer is at maximum capacity, it is also unable to process received tuples. In this manner, backpressure in one processing element 235 may spread to other processing elements.

In another embodiment, backpressure may occur when a processing element—e.g., PE16—receives tuples from two different processing elements—e.g., PE9 and PE11. For example, PE16 may be able to process tuples as quickly as they are received from PE9; however, PE16 may begin to buffer tuples when it must process received tuples from both PE9 and PE11. Eventually, the buffer may reach maximum capacity and cause PE16 to begin to refuse tuples sent from PE9 or PE11.

In another embodiment, a CPU 205 associated with a processing element may be used by other processing elements. For example, other processing elements may be added or moved to a compute node 130 which slows down a shared CPU 205 and causes the data throughput on a processing element to decrease. Similarly, a processing element may be moved to a different computer node 130 where the CPU 205 has a greater utilization percentage. Both of these examples demonstrate the effect of hardware on backpressure. Specifically, backpressure may occur without a change in the operator graph or data rates flowing between processing elements.

Additionally, the stream manager 134 may determine if adding a new job with its accompanying processing elements 235 will cause backpressure. For example, PE16 may be able to process tuples as quickly as they are received from both PE9 and PE11. However, the CPU 205 associated with PE 16 may be running near maximum utilization—e.g., 90%-99% CPU utilization. Adding another data path that transmits data from PE15 to PE16 may exceed the capabilities of the CPU 205. Thus, if the stream manager 134 adds Job 3 to the operator graph 132 and the CPU 205 can now no longer process the tuples as fast as they are received, PE16's buffer may fill up and cause backpressure to spread to other processing elements.

A processing element may temporarily be unable to process tuples as fast as they are received but may not be experiencing backpressure—i.e., blocking other PEs from sending it data. For example, the usage of a CPU may suddenly spike due to routine system maintenance which may cause tuples to be loaded into the buffered stream data 260. These temporary slowdowns may be sufficiently controlled and handled by the buffers associated with each processing element. Instead, the stream monitor 134 may use a predetermined period of time when evaluating whether backpressure is going to occur. That is, the stream monitor 134 may be configured to ignore temporary slowdowns and identify a processing element that is constantly unable to process tuples as fast as they are received which may eventually result in the processing element experiencing backpressure.

Returning to FIG. 4, at step 410 the stream manager 134 monitors each processing element for an indicator of backpressure. In general, backpressure occurs after the data throughput of a processing element decreases such that the processing element receives data faster than it can process the data, or if the processing element is blocked from sending data to a downstream processing element. Backpressure may result in any one of the situations described above.

The stream manager 134 may monitor several indicators to detect backpressure in a processing element 235. In one embodiment, the stream manager 134 may monitor the buffered stream data 260. If the buffered stream data 260 exceeds the capacity of the buffer storage, then backpressure occurs. Alternatively, the stream manager 134 may monitor a rate the buffered stream data 260 is increasing (or decreasing) or set a threshold that is less than the capacity of the buffer. In the former example, the stream manager 134 monitors the current amount of data stored in the buffer at certain intervals of time. The stream manager 134 may then use this information to determine a rate that specifies whether the usage of the buffer is increasing or decreasing. Moreover, the stream manager 134 may take the average of multiple measured rates to determine whether backpressure is occurring (rather than a temporary increase in data being stored in the buffer). If the rate is above a certain value, the stream manager 134 may assume backpressure is occurring. In the latter example, the stream manager 134 may set a threshold that is less than the capacity of the buffer—e.g., 75% of the total capacity. Nonetheless, in both examples, the stream manager 134 may advantageously detect backpressure before it begins to spread to other upstream processing elements. For example, if the rate at which the amount of data in a buffer is increasing is above 20%, the stream manager 134 may determine, before the buffer reaches maximum capacity, that a processing element is unable to process tuples as fast as it receives them.

In one embodiment, the response time of the processing element may be an indicator of backpressure. The stream manager 134 may flag certain tuples and measure the length of time needed for the tuples to be processed and transmitted by a processing element or a group of processing elements (e.g., a job). The stream manager 134 may store the measured response time and compare it to current response times. Backpressure may be occurring if the response times increases beyond a threshold or percentage of the previously measured response times—e.g., a 50% increase in response time. Additionally, the stream manager 134 may require the response time to increase for a certain period of time or for a certain number of flagged tuples to ensure that the longer response times are not because of a temporary slowdown that will not cause constant backpressure (e.g., routine system maintenance may cause the transient time to spike).

In one embodiment, the CPU utilization associated with a processing element may be an indicator of backpressure. As mentioned previously, CPU utilization may cause backpressure. Accordingly, the stream manager 134 may monitor the CPU utilization to determine if an associated processing element is experiencing backpressure. For example, if the CPU associated with a processing element is being used around 100% constantly, the stream manager 134 may assume that there is backpressure on any processing elements that use the CPU.

Moreover, CPU utilization may indicate future backpressure. For example, referring to FIG. 5, if the stream manager receives a request to add Job 3 to the operator graph but determines that the CPU associated with PE16 is running at or near its maximum capabilities, then the stream manager 134 may assume that adding Job 3, which transmits additional tuples to PE 16, will cause backpressure. That is, the CPU utilization percentage may indicate that backpressure is not currently occurring but backpressure is likely to occur if other tasks are assigned to the processing elements associated with the CPU.

In one embodiment, the stream manager 134 may record and use historical information 265 as an indicator of future backpressure. The stream manager 134 may record whenever backpressure was previously detected (e.g., by any of the methods discussed above) and save the conditions that caused the backpressure as historical information 265. If, while monitoring a processing element, the stream manager 134 detects the same conditions saved in the historical information 265, the stream manager 134 may assume that backpressure will again occur. For example, referring to FIG. 5, if the stream manager 134 receives a request to add Job 3 to the operator graph, but the historical information 265 indicates that backpressure occurred last time Job 3 began to send tuples to PE16, the stream manager 134 may assume that future backpressure will occur if Job 3 is added.

Any combination of the above mentioned indicators of backpressure may be combined in a weighted formula as an indicator of backpressure. For example, the stream manager 134 may monitor both the response time and the buffered stream data 260 to determine whether backpressure is occurring. Moreover, one of ordinary skill in the art will recognize the different indicators that may be monitored to determine whether backpressure is occurring, or will occur, in a stream application.

At step 415, the stream manager 134 determines if there is an indicator of present or future backpressure. If so, the method 400 moves to step 420. Otherwise, the stream manager 134 returns to step 410 and continues to monitor each processing element 235.

After an indicator of backpressure is detected, the stream manager 134 changes the rate of data flowing through at least one processing element such that the backpressure is alleviated or prevented. The stream manager 134 may change the data rate through a processing element that is not experiencing backpressure or the processing element that is experiencing, or will experience, the backpressure (or both). In one embodiment (illustrated in FIGS. 6A-6C), the stream manager 134 changes the flow of data in a processing element that is upstream from the processing element that is experiencing backpressure. In another embodiment (illustrated in FIGS. 7A and 7C), changes may be made to processing elements that are downstream of the processing element that is experiencing backpressure. In general, backpressure may be alleviated by reducing the amount of data a processing element receives or by reducing the amount of processing the processing element must perform on the received data (or both).

Figure 6A:
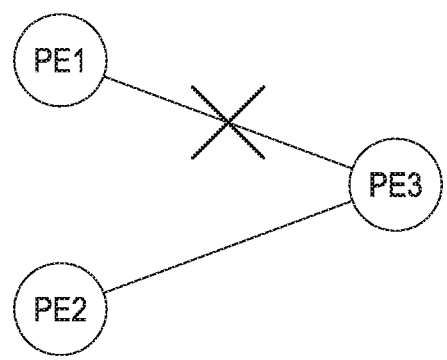
FIGS. 6A-6C are diagrams illustrating methods of lessening or preventing backpressure, according to embodiments of the invention.
Figure 6B:
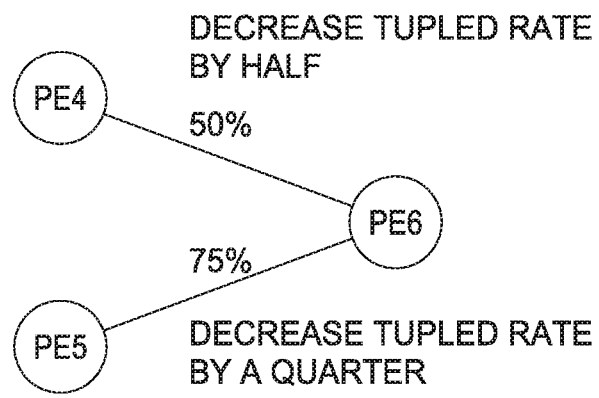
Figure 6C:
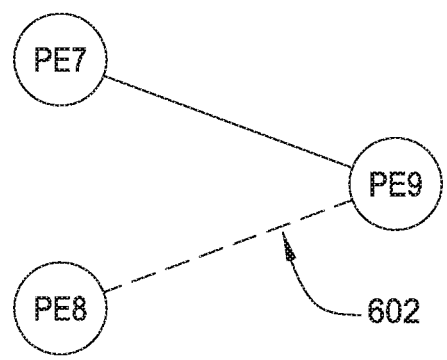

FIGS. 6A-6C are diagrams illustrating methods of lessening or preventing backpressure, according to embodiments of the invention. FIG. 6A is an operator graph that illustrates removing a data path or processing element that is transmitting data to a second processing element. For example, PE1 may have recently been added to the operator graph which contained PE2 and PE3. However, the addition of PE1 may cause the stream manger 134 to detect backpressure at PE3 using one of the indicators discussed above. Accordingly, the stream manager 134 may alleviate the backpressure by removing PE1 from the operator graph or preventing PE1 from transmitting data to PE3 along the data path (indicated by the "X"). In one embodiment, the stream manager 134 may alleviate backpressure in a processing element that is at least two hierarchical levels downstream from the processing element that is removed—i.e., a processing element downstream of PE3. By removing PE1, for example, the stream manager 134 may also decrease the amount of data flowing to any processing element that is downstream of PE1, and thus, any backpressure experienced by that processing element. In this manner, the stream manager 134 may alleviate backpressure by changing the flow of data in a processing element that is different from the processing element experiencing the backpressure.

In one embodiment, if the stream manager 134 detects that future backpressure may occur when an additional processing element is included, the stream manager 134 may eliminate a current processing element (or data path) so that future backpressure does not occur when the new processing element is added. That is, removing the current processing element frees at least enough computing resources to process the data supplied by the additional processing element without creating backpressure.

Further, each of the data paths and processing elements may be prioritized according to an importance of the processing element or associated job, the amount of data being sent by the processing element, how data is used in downstream processing elements, or by the amount of time needed for a tuple to progress through a processing element or job.

Each processing element may be prioritized individually or by its association with a job. For example, a processing element may be part of a job that processes information submitted by a client, and as such, may be given a higher priority than a processing element that performs routine system maintenance that may be delayed to execute at a different time. Alternatively, the priority of each job or processing element may be set by a system administrator. The stream manager 134 may then delete the processing element with the lowest priority. In a similar embodiment, the processing elements may be prioritized according to first-in first-out (FIFO) or last-in first-out (LIFO) algorithms. Accordingly, the first processing element that connected to PE3 may be the first deleted or the last processing element that connected to PE3 may be the first deleted.

The processing elements may be prioritized based on the amount of data sent on a respective data path. If, for example, PE1 sends triple the amount of tuples to PE3 than PE2, then PE1 may be given a higher priority since the most data will not reach PE3 if PE1 is eliminated. In another embodiment, PE1 may be deleted since it is transmitting the most data and is likely the greatest cause of backpressure to a downstream processing element.

The processing element may be prioritized based on how that data is used by downstream processing elements. For example, if the data sent on one data path is used by several downstream processing elements, it may be given a greater priority than data on a data path that is used by only one downstream processing element.

The processing elements may be prioritized according to their response times necessary to transmit data tuples, for example, the slowest processing element is given the lowest priority. A downstream processing element with a slow response time may be unable to process data as fast as it is received, thus causing backpressure that may spread to upstream processing elements. Accordingly, the stream manager 134 may remove one or more connections to the slowest processing element which may cause backpressure on upstream processing elements.

Moreover, any combination of the above mentioned prioritization methods may be combined in a weighted formula. Furthermore, the listed methods of prioritizing processing elements and data paths are exemplary only. Any method that prioritizes processing elements or data paths and is compatible with the functionality described herein is contemplated by this disclosure.

The operator graph illustrated in FIG. 6A is not limited to two processing elements that send tuples to a single processing element. Instead, there may be only one processing element that transmits data to a second processing element or more than two processing elements transmitting data to a single processing element. Moreover, when there are multiple processing elements connected to a single processing element, more than one processing elements or data paths may be removed to alleviate any backpressure on a processing element farther downstream in the operator graph.

FIG. 6B is an operator graph that illustrates changing, for at least one processing element, the rate that tuples are transmitted along a data path to alleviate backpressure. As shown, PE4 sends tuples to PE6 at a rate that is 50% of the original rate and the PE5 now sends tuples to PE6 at a rate that is 75% of the original rate. For example, if PE4 previously sent 100 tuples per second to PE6, the stream manager 134 has cut that rate to 50 tuples per second. Though PE6 receives only a fraction of the data that was intended for it, doing so permits all connections to be maintained and provides PE6 with at least a sampling of the data. This reduction of transmitted data may alleviate backpressure that is occurring at PE6 or any processing element that is farther downstream on the operator graph.

In one embodiment, the stream manager 134 may reduce data rates on multiple data paths by using a round-robin approach. Specifically, the stream manager 134 may allow PE4 to send a tuple to PE6 only after PE5 has sent a tuple. Again, PE6 may receive only a sampling of the data. However, each upstream processing element is treated equally and the data flowing to PE6 may be decreased. Alternatively, the PE4 and PE5 and their associated data paths may be prioritized using any of the methods discussed in relation to FIG. 6A. The data rate may then be changed based on the assigned priority. For example, PE5 may be part of a client job, and thus, ranked higher than PE4. Based on the ranking, the stream manager 134 may then reduce the data rate for PE5 by only a quarter while reducing the data rate associated with PE4 by a half.

In one embodiment, the stream manger 134 may detect that future backpressure will occur if a job is added. Instead of denying the request, the stream manager 134 may prevent backpressure by changing the rate that current processing elements transmit data. Presumably, the stream manager 134 would change the rates such that enough computing resources are freed to handle the new data that may be transmitted by the new job, and thus, prevent any backpressure.

The operator graph illustrated in FIG. 6B is not limited to two processing elements that send tuples to a single processing element. Instead, there may be only one processing element that transmits data to a second processing element or more than three processing elements transmitting data.

FIG. 6C is an operator graph that illustrates a method of denying a request for adding a new processing element. The stream manager 134 may deny a request to add a job or processing element to an operator graph based on indicators of future backpressure. Specifically, stream manager 134 may receive a request to add or change the operator graph such that PE8 transmits tuples to PE9. Before changing the operator graph, the stream manager 134 may detect that the change will cause future backpressure in PE9 or another processing element located farther downstream. An indicator may be that the CPU usage for the CPU 205 associated with PE9 is at or near maximum utilization, and therefore, sending additional tuples to PE9 will cause backpressure. Alternatively, the stream manager 134 may have previously added PE8 to the operator graph which caused backpressure in a downstream processing element. Using this historical information 265, the stream manager 134 may determine that adding PE8 will again cause backpressure. The ghosted line 602 indicates that the stream manager 134 denied the request to add the processing element.

Although only three processing elements are shown, in another embodiment, FIG. 6C may include only one processing element attempting to connect to a second processing element. Additionally, there may be two or more processing element already connected to one processing element before the stream manager 134 receives a request to connect another processing element.

Figure 7A:
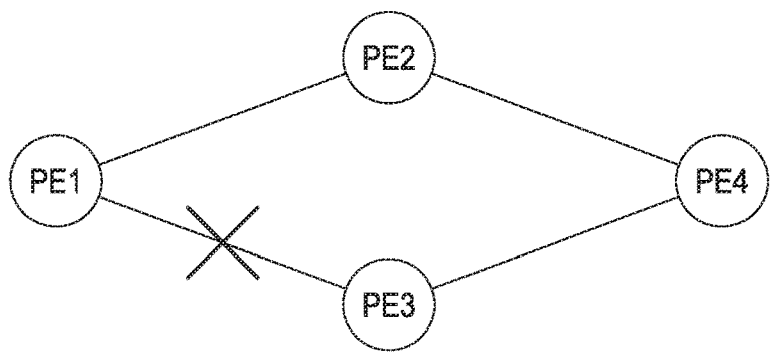
FIGS. 7A-7C are diagrams illustrating methods of lessening or preventing backpressure, according to embodiments of the invention.
Figure 7B:
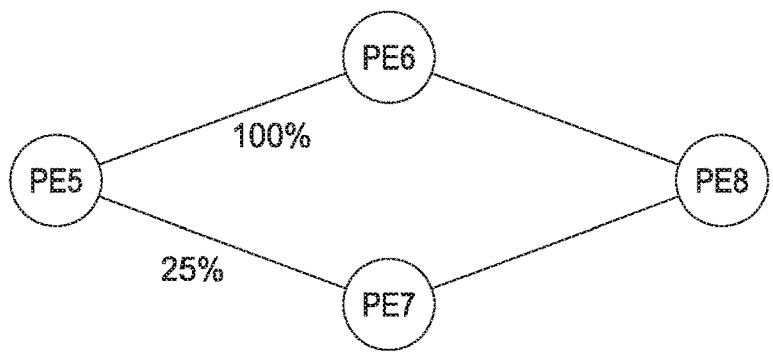
Figure 7C:
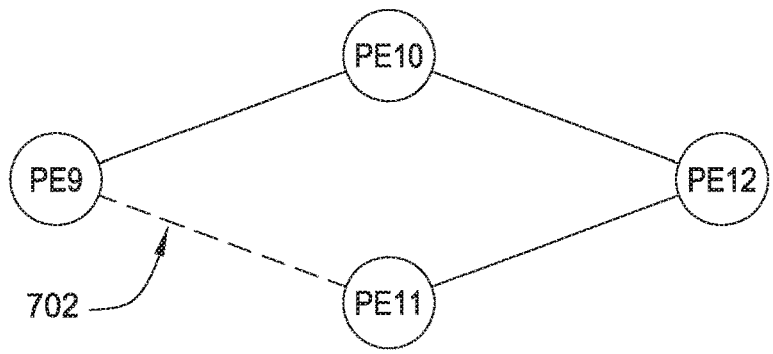

FIG. 7A-7C are diagrams illustrating methods of lessening or preventing backpressure, according to embodiments of the invention. FIG. 7A, in contrast to FIG. 6A, is an operator graph illustrating removing a data path from a processing element—PE1—that transmits tuples on multiple data paths rather than receiving tuples on multiple data paths. However, both FIGS. 6A and 7A illustrate methods of alleviating or preventing backpressure. In FIG. 7A, at least one of the multiple data paths transmitting tuples from PE1 may be eliminated to prevent or lessen backpressure. If the backpressure is located at PE4, eliminating the data path from PE1 to PE3 may lessen the amount of data in the tuples that are sent from PE3 to PE4, or could cause PE3 to send less tuples to PE4.

In one embodiment, if the backpressure is at PE1, removing PE3 would lessen the amount of tuples that must be transmitted from PE1, thereby permitting PE1 to increase its data throughput. That is, PE1 no longer must perform the processing required to transmit tuples to PE3. PE1 may then use the freed computer resources to process the data that it sends on the remaining connection. In this manner, removing a downstream processing element—e.g., PE3—may alleviate the backpressure experienced by an upstream processing element—e.g., PE1.

In one embodiment, if the stream manager 134 detects that future backpressure that may occur when an additional processing element is added, the stream manager 134 may eliminate a current processing element (or data path) so that future backpressure does not occur when the new processing element is added. Stated differently, removing the current processing element frees at least enough computing resources to process the data supplied by the additional processing element without creating backpressure.

In another embodiment, each of the data paths may be prioritized using the methods described in the description accompanying FIG. 6A. In this manner, the lowest priority data path or paths are eliminated first.

FIG. 7B is an operator graph illustrating alleviating backpressure by changing the rate that tuples are transmitted along multiple data paths from a single processing element. Specifically, PE5 continues to send tuples to PE6 at a rate that is 100% that of the original rate but sends tuples to PE7 by a rate that is 25% that of the original rate. Though PE7 receives only a fraction of the data that was intended for it, doing so permits all connections to be maintained and provides each processing element with at least a sampling of the data. In this manner, changing the data rate may alleviate backpressure that is occurring at PE6 or any processing element that is farther downstream on the operator graph—e.g., PE8.

In one embodiment, the stream manager 134 may reduce data rates on multiple data paths by using a round-robin approach. Specifically, the stream manager 134 may allow PE5 to send a tuple to PE6 only after PE5 has sent a tuple to PE7 and vice versa. Again, PE6 and PE7 may receive only a sampling of the data. However, each downstream processing element is treated equally and the data flowing to PE8, along with backpressure, may be decreased.

In one embodiment, if the backpressure is at PE5, changing the rate at which PE5 sends data to PE6 or PE7 would lessen the amount of tuples that must be transmitted from PE5 and thus permit PE5 to increase its data throughput. For example, if PE5 must write to a database (i.e., a time consuming process) before sending a tuple to PE7, then reducing the rate that tuples are sent by 75% may also reduce the number of writes to the database by 75%. By transmitting only 25% of the intended data to PE7, PE5 may be able to process data as fast as it is received by discarding a portion of the incoming data. Any incoming data that is discarded does not have to be processed by PE5.

Further, the multiple data paths associated with PE5 may be prioritized using any of the methods discussed in relation to FIG. 6A. The stream manager 134 may then change the data rate based on the assigned priority.

In one embodiment, the stream manger 134 may detect that future backpressure will occur if a job is added. Instead of denying the request, the stream manager 134 may prevent backpressure by changing the rate that current processing elements transmit data. For example, the stream manager 134 may change the rates such that enough computing resources are freed to handle the new data that may be transmitted by the new job, and thus, prevent any backpressure.

FIG. 7C is an operator graph that illustrates a method of denying a request for adding a new data path between two processing elements in the operator graph. The stream manager 134 may deny a request to add a new data path to an operator graph based on one or more indicators of future backpressure. Specifically, stream manager 134 may receive a request to add or change the operator graph such that PE9 transmits tuples to PE11. Before changing the operator graph, the stream manager 134 may detect that the change will cause future backpressure in PE12 or another processing element located downstream. An indicator may be that the CPU utilization for the CPU 205 associated with PE11 is at, or near, maximum utility, and therefore, sending additional tuples to PE11 will cause backpressure. Alternatively, the stream manager 134 may have previously added the data path between PE9 and PE11 to the operator graph which caused backpressure in a downstream processing element. Using historical information 265, the stream manager 134 may recognize that adding the data path will again cause backpressure. The ghosted line 702 indicates that the stream manager 134 denied the request to add the data path.

In another embodiment, adding PE11 to the operator graph may cause future backpressure at PE9—i.e., a processing element upstream from the element to be added. The historical information 265 or the CPU 205 associated with PE9 may alert the stream manager 134 that backpressure may occur. By preventing a downstream processing element from being added—i.e., PE11—the stream manager 134 may prevent backpressure at an upstream processing element—i.e., PE9.

Although only two data paths are shown in FIGS. 7A-7C, a processing element may have only one data path, or more than two data paths, that transmit data and still use the techniques described above.

In general, a stream manager 134 monitors each processing element for an indicator of current or future backpressure. Once an indicator is detected, the stream manager 134 may use the backpressure logic module 327 to determine the action (e.g., one of the actions illustrated in FIGS. 6A-6C and 7A-7C) that will alleviate or prevent backpressure. The stream manager 134 then performs this action.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of processing data in a stream application, comprising:
   receiving streaming data to be processed by a plurality of processing elements, the processing elements processing at least a portion of the received data by operation of one or more computer processors, wherein each of the processing elements comprises an executable portion of code;
   establishing an operator graph of the plurality of processing elements, the operator graph defining at least one execution path through which the streaming data flows through the plurality of processing elements, and wherein each processing element in the execution path is configured to at least one of receive data from at least one upstream processing element and transmit data to at least one downstream processing element;
   receiving a request to add a first processing element to the execution path of the operator graph;
   before adding the first processing element, identifying a predicted relative change of data throughput in a second processing element in the execution path, wherein the predicted relative change of data is based on predicting a utilization rate of one of the computer processors resulting from adding the first processing element to the operator graph;
   upon determining that the relative change of data throughput satisfies a predetermined threshold, determining not to add the at first processing element to the operator graph; and
   upon determining that a relative change of data throughput corresponding to a third processing element does not satisfy a predetermined threshold, adding the third processing element to the operator graph.

2. The method of claim 1, wherein the utilization rate is associated with the second processing element.

3. The method of claim 1, wherein the request to add the first processing element to the operator graph is predicted to increase the amount of data flowing to the second processing element.

4. The method of claim 1, wherein predicting the effect that adding the the first processing element will have on the utilization rate is performed by evaluating historical information containing the conditions of the operator graph that caused backpressure previously.

5. The method of claim 1, wherein the first processing element is upstream in the execution path relative to a location where the the first processing element is to be inserted into the execution path.

6. The method of claim 1, wherein the second processing element is downstream in the execution path relative to a location where the the first processing element is to be inserted into the execution path.

7. A system for processing data, comprising:
a computer processor; and
a memory containing a program that, when executed on the computer processor, performs an operation for processing data, comprising:
receiving streaming data to be processed by a plurality of processing elements, wherein each of the processing elements comprises an executable portion of code;
establishing an operator graph of the plurality of processing elements, the operator graph defining at least one execution path through which the streaming data flows through the plurality of processing elements, and wherein each processing element in the execution path is configured to at least one of receive data from at least one upstream processing element and transmit data to at least one downstream processing element;
receiving a request to add a first processing element to the execution path of the operator graph;
before adding the first processing element, identifying a predicted relative change of data throughput in second processing element in the execution path, wherein the predicted relative change of data is based on predicting a utilization rate of the computer processor resulting from adding the first processing element;
upon determining that the relative change of data throughput satisfies a predetermined threshold, determining not to add the first processing element to the operator graph; and
upon determining that a relative change of data throughput corresponding to a third processing element does not satisfy a predetermined threshold, adding the third processing element to the operator graph.

8. The system of claim 7, wherein the utilization rate is associated with the second processing element.

9. The system of claim 7, wherein the request to add the first processing element to the operator graph is predicted to increase the amount of data flowing to the second processing element.

10. The system of claim 7, wherein predicting the effect that adding the first processing element will have on the utilization rate is performed by evaluating historical information containing the conditions of the operator graph that caused backpressure previously.

11. The system of claim 7, wherein the second processing element is upstream in the execution path relative to a location where the first processing element is to be inserted into the execution path.

12. The system of claim 7, wherein the second processing element is downstream in the execution path relative to a location where the first processing element is to be inserted into the execution path.

13. The system of claim 7, wherein each of the plurality of processing elements comprises at least one operator, wherein the operator comprises the executable portion of code.

14. A computer program product for processing data, the computer program product comprising:
a non-transitory computer-readable storage medium having computer-readable program code embodied therewith, the computer-readable program code, when executed on one or more computer processors, is configured to:
receive streaming data to be processed by a plurality of processing elements, the processing elements processing at least a portion of the received data by operation of the one or more computer processors, wherein each of the processing elements comprises an executable portion of code;
establish an operator graph of the plurality of processing elements, the operator graph defining at least one execution path through which the streaming data flows through the plurality of processing elements, and wherein each processing element in the execution path is configured to at least one of receive data from at least one upstream processing element and transmit data to at least one downstream processing element;
receive a request to add a first processing element to the execution path of the operator graph;
before adding the first processing element, identify a predicted relative change of data throughput in a second processing element in the execution path, wherein the predicted relative change of data is based on predicting a utilization rate of the computer processor resulting from adding the first processing element;
upon determining that the relative change of data throughput satisfies a predetermined threshold, determine not to add the first processing element to the operator graph; and
upon determining that a relative change of data throughput corresponding to a third processing element does not satisfy a predetermined threshold, add the third processing element to the operator graph.

15. The computer program product of 14, wherein the utilization rate is associated with the second processing element.

16. The computer program product of claim 14, wherein the request to add the first processing element to the operator graph is predicted to increase the amount of data flowing to the second processing element.

17. The computer program product of claim 14, wherein predicting the effect that adding the first processing element will have on the utilization rate is performed by evaluating historical information containing the conditions of the operator graph that caused backpressure previously.

18. The computer program product of claim 14, wherein the second processing element is upstream in the execution path relative to a location where the at least one processing element is to be inserted into the execution path.

19. The computer program product of claim 14, wherein the second processing element is downstream in the execution path relative to a location where the first processing element is to be inserted into the execution path.

20. The computer program product of claim 14, wherein each of the plurality of processing elements comprises at least one operator, wherein the operator comprises the executable portion of code.

* * * * *